United States Patent [19]

Fogg

[11] Patent Number: 4,979,607
[45] Date of Patent: Dec. 25, 1990

[54] BOTTLE UNSCRAMBLER

[75] Inventor: Jon G. Fogg, Holland, Mich.

[73] Assignee: Fogg-Filler Co.

[21] Appl. No.: 313,591

[22] Filed: Feb. 21, 1989

[51] Int. Cl.$^5$ .............................................. B65G 47/24
[52] U.S. Cl. .................................... 198/392; 198/393; 198/400; 198/448
[58] Field of Search ............... 198/384, 389, 390, 392, 198/393, 397, 400, 445, 447, 448, 449, 450, 451, 452

[56] References Cited

U.S. PATENT DOCUMENTS

| | | | |
|---|---|---|---|
| 3,295,659 | 1/1967 | Aidlin | 198/400 X |
| 3,338,373 | 8/1967 | Aidlin et al. | 198/397 |
| 3,372,790 | 3/1968 | Pembroke et al. | 198/397 |
| 3,490,574 | 1/1970 | Taylor et al. | 198/448 X |
| 3,650,368 | 3/1972 | Nalbach | |
| 3,662,872 | 5/1972 | Nalbach | |
| 3,948,386 | 4/1976 | Nalbach | |
| 4,073,372 | 2/1978 | List | 198/447 X |
| 4,681,209 | 7/1987 | Marti | 198/392 |
| 4,825,995 | 5/1989 | Nalbach | 198/400 X |
| 4,828,100 | 5/1989 | Hoppmann et al. | 198/392 |

Primary Examiner—H. Grant Skaggs
Assistant Examiner—James R. Bidwell

[57] ABSTRACT

A bottle unscrambler has a hopper which rotates while oriented at an angle to the horizontal through a random distribution of bottles at the low portion of the hopper. The bottom of the hopper is bounded by a ring which rotates counter to the direction of rotation of the hopper. The ring has a plurality of radially spaced concentric rows of bottle-receiving pockets which pass below the bottles. Each pocket in the ring removes a bottle from the randomly distributed bottles and carries the bottle up to a position where each concentric row of bottles is dropped bottom first into a plurality of radially spaced chutes, positioned below and separated from the hopper by the rotating ring, from which chutes the bottles in one row are fed to alternate compartments of a bottle stabilizing ring with the bottles from the radially adjacent compartment being dropped and inserted into the alternate spaces between the bottles on the stabilizing ring. The serially combined bottles are then moved about the internal periphery of the machine and brought up to a vertical position where they are transferred to a conveyor belt moving at substantially the same speed to exit from the machine in proper orientation and with a minimum amount of wobble or tendency to fall. The disclosed machine is capable of operating in the range of twice the speed of any machine currently available.

12 Claims, 4 Drawing Sheets

BOTTLE UNSCRAMBLER

BACKGROUND OF THE INVENTION

The present invention relates to a bottle unscrambler machine for use in handling small bottles or containers which would be fed to the machine in a bulk random configuration. The bottles can be made of plastic, metal, or glass so long as the material and configuration can withstand the forces involved in the unscrambling process.

In the past, some bottle orienting machines have been built in a horizontal plane with bottle aligning means and chutes for receiving the oriented bottles positioned approximately 180° apart from each other. In these machines, the bottles would be circulated in a rotating hopper and would eventually align one behind the other. The bottles would then move to an elevating mechanism where the bottles would be shoved up an inclined plane by a pusher which would take the bottles to the bottle aligning device which included a tilted shelf high above the hopper from which the bottle would drop bottom down into a chute. Each chute was designed to carry two circumferentially spaced adjacent bottles. The bottles would then undergo either a single or a double drop to reach the exit conveyor. The number of drops was dependent on the position of the exit chute relative to the conveyor and to the distance the aligned bottles would travel in the machine before exiting. The longer the bottle could be stabilized, the less likely it was to fall during transfer to a conveyor belt. An example of this type of bottle aligning machine can be seen in U. S. Pat. No. 3,662,872 issued May 16, 1972, to Nalbach and U. S. Pat. No. 3,848,386 issued Apr. 6, 1976, to Nalbach.

In another example of a bottle unscrambler machine, the axis of rotation of the machine was set at approximately 30° relative to the horizontal with the bottles being dumped into the hopper at the low end and then being fed in a single row up the inner wall of the hopper to an exit station where the bottles would be dropped bottom down into exit chutes which would again cause the bottles to go through a double drop before being carried a sufficient distance within the machine to become stabilized so they could exit the machine without danger of toppling during transfer to the conveyor belt. A machine of the latter type is disclosed in U. S. Pat. No. 3,650,368 issued Mar. 21, 1972, to John C. Nalbach, the entire teaching of which patent is incorporated herein by reference.

According to the teaching of Nalbach 3,650,368, bulk plastic bottles are dumped into an inclined hopper which is caused to rotate by an electric motor equipped with suitable gear reduction means. The bottles are caused to circulate in the hopper and are scrambled by suitable mixing bars to prevent the bottles from blocking or bridging over the entrances to the bottle aligning chambers which are positioned in the hopper between the edge of the cone forming the bottom of the hopper and the interior edge of the hopper. The Nalbach machine is designed to carry one row of bottles about the internal periphery of the machine up to a point where the bottles can drop into any one of a plurality of chutes which are joined together to form a drum which is rotated by the same rotating means that rotate the hopper. The bottles drop to the bottom of each chute where they are supported by a shelf which carries the bottles less than 360° around the interior of the shell of the machine At a point within the machine, the bottles drop individually into circumferentially spaced adjacent compartments where they are carried about the interior of the machine until they are brought to a tangential exit conveyor running at substantially the same speed as the speed of rotation of the unscrambler so that the bottles can be fed onto the conveyor without being destabilized. A machine of this type is capable of unscrambling, that is, aligning all of the bottles in a single direction and serially exiting the bottles from the machine at the rate of approximately 150 bottles per minute.

SUMMARY OF THE INVENTION

According to the teaching of the present invention, a bottle unscrambler substantially as disclosed by Nalbach in U. S. Pat. No. 3,650,368 has been improved upon in a unique way which greatly enhances the output rate of the machine. It is within the teaching of the present invention to further increase that speed by adding additional bottle aligning means and means for serializing the bottles for exit from the machine.

In accordance with the teachings of the present invention, the bottle receiving chutes are positioned below the level of the hopper. Above the chutes and separating the chutes from the hopper is a rotating ring having concentric or radially spaced bottle-receiving and aligning pockets. In the embodiment of the invention disclosed herein, the aligning means has two concentric rows of pockets. As the concentric rows of pockets in the bottle orienting and alignment ring are filled, they are brought around to the high point of the machine where the bottles undergo a first drop into radially spaced holding chambers. The radially spaced bottles then proceed onward where the outer row of bottles undergoes a second drop into alternate serially spaced compartments in the stabilizing ring which support and stabilize the bottles for the remainder of the trip about the interior of the unscrambler. The interior radially spaced bottles drop and are directed by chutes to shift through apertures in the wall of the stabilizing ring into the empty bottle-receiving compartments thereby filling the compartments and serially organizing the bottles for their stabilization ride before exiting on a tangential conveyor belt.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
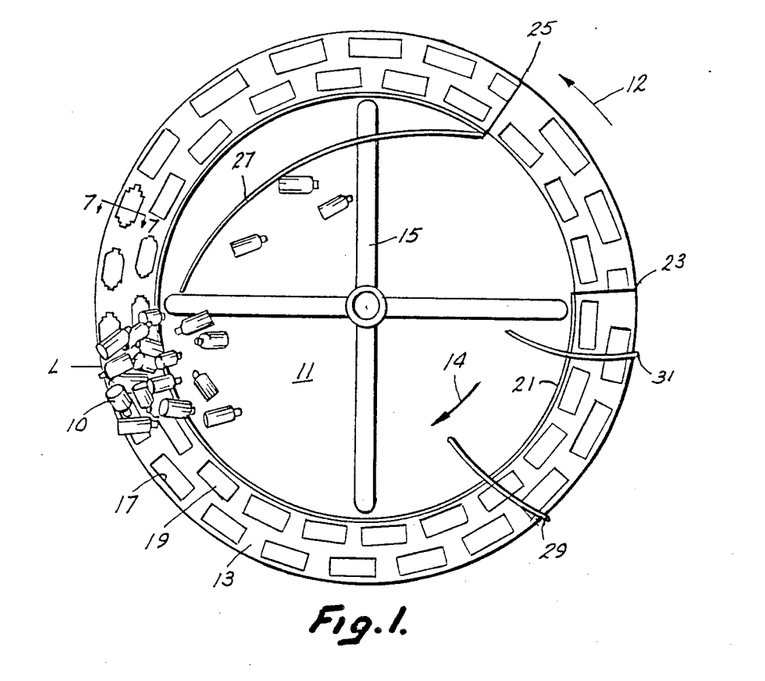
FIG. 1 is a top plan view of the unscrambler showing the position of the hopper bottom and the bottle aligning ring.

Referring to FIG. 1, a random collection of bottles 10 is shown at what would be the low point "L" of the hopper of the bottle unscrambler. The axis of rotation of the improved bottle unscrambler is tilted as is the axis of rotation of the unscrambler of Nalback U.S. Pat. No. 3,650,368 so that a supply of bottles to be unscrambled rests at the low point of the hopper. At this point, the bottles are resting on the hopper bottom 11 and on the aligning ring 13. The bottom 11 and the aligning ring 13 rotate in opposite directions relative to one another. Bottle mixing bars 15 are mounted on the bottom 11 to keep the pile of bottles scrambled so that they cannot bridge over the aligning ring 13 and fail to fall into the concentrically spaced pockets 17 and 19.

Figure 2:
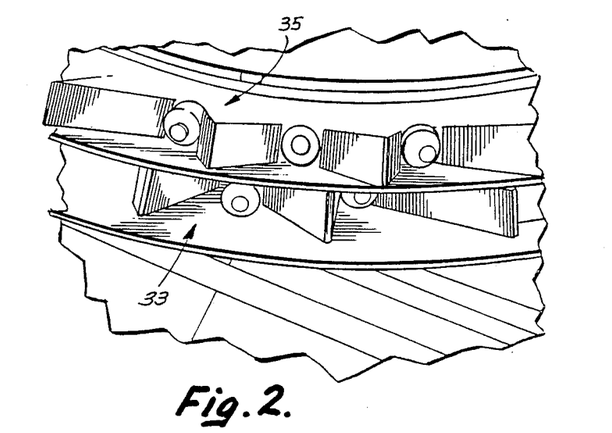
FIG. 2 is a fragmentary view of the first and second radially spaced chutes showing bottles in place.
Figure 3:
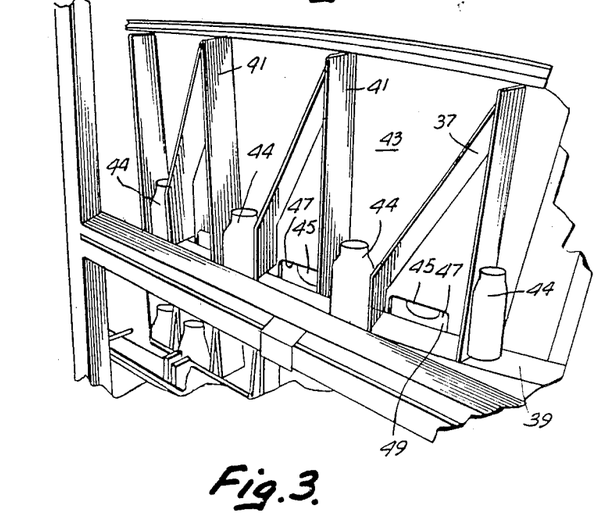
FIG. 3 is a fragmentary, elevational view showing a portion of the outermost chute with bottles supported and also with bottles visible in the internal radial chute.
Figures 7, 8:
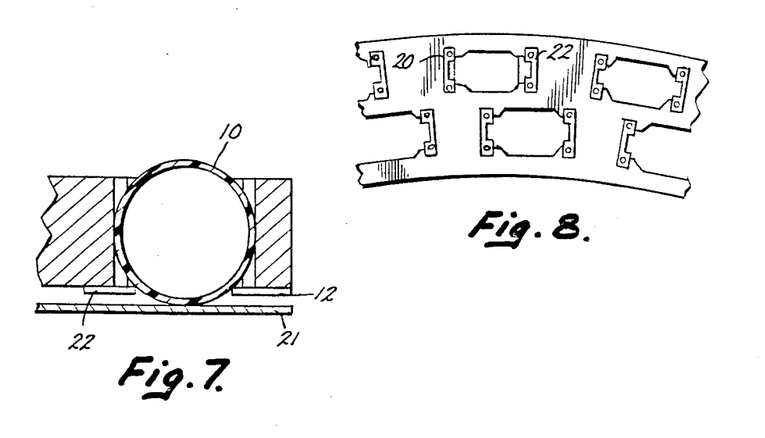
FIG. 7 is a partial sectional view along the line 7—7 of FIG. 1 showing a bottle supported by the fixed support shelf adjacent to the bottle aligning means.
FIG. 8 is a view of the bottom of a portion of the aligning ring showing the configuration of the offset pockets and the bottle tripping or aligning means at each end of a pocket.

As shown in FIG. 1, the bottle aligning ring would be rotating in a counterclockwise, see directional arrow 12, direction with the hopper bottom rotating in a clockwise direction, see directional arrow 14. The bottles would be picked up from the pile 10 and would fall randomly into the pockets 17 and 19. In the bottles' path from the lower portion of machine to the upper portion, the bottles are supported within the pocket by a fixed support shelf 21 (see FIGS. 1 and 7) positioned beneath the aligning ring 13 and essentially parallel thereto. The shelf 21 does not rotate with the ring 13 and does not extend the full circumference. In effect, the bottles 10 in the pockets slide supportably along the shelf 21 (FIG. 7). The shelf 21 ends at 23 which is the point where the bottles can then drop freely into their respective radially spaced chutes. Within each of the pockets 17 and 19 and preferably at each end of the pockets, is mounted a trip means 20 and 22 shown in FIGS. 7 and 8. In FIG. 8, the bottle receiving pocket 19 in the aligning ring 13 is configured to hold a bottle regardless of its orientation. At each end the pocket 19 is reduced in size to conform to the neck portion of a bottle. The trip means 20 and 22 are positioned at opposed neck portions of the pocket 19 and provide temporary support for the neck portion of the bottle regardless of its orientation in the pocket when the bottle passes off of the end of fixed shelf 21 This temporary support of the neck is sufficient to start the bottom of the bottle down into the chute first thereby aligning all of the bottles in an upright position. The steel plate 21 begins again at 25 where it is again in position to support bottles as they are picked up from the random pile 10 by the bottle aligning ring 13. A bottle-deflecting vane 27 is mounted vertically in the hopper and is used to redirect loose bottles back to the low point of the hopper. Also mounted within the hopper are deflectors or whiskers 29 and 31 which are used to brush off any loose bottles riding on the surface of the aligning ring 13. For example, it is possible when bottles are in both pockets 17 and 19 for a third bottle to ride in between these two bottles The whiskers 29 and 31 deflect any such bottles back to the bottom of the hopper where they again join the random mix of bottles After the bottles fall out of the pockets 17 and 19, as the supported bottles pass off the edge of steel-supporting plate 21, the bottles drop into radially spaced offset chutes 33 and 35. As seen in FIG. 2, the bottles from pockets 17 fall into chutes 33, and the bottles from pockets 19 fall into chutes 35. In the preferred embodiment of the machine being disclosed in the instant application, only two radially spaced concentric rows of offset bottle-receiving and aligning pockets are shown in the aligning ring 13 and in turn, only two radially spaced banks of chutes are shown for capturing bottles from the two concentric rows. It is within the scope of the present invention to modify the disclosed machine to support even more bottles and to provide even more chutes to increase the overall production of the machine Referring to FIGS. 2 and 3, it can be seen that as a bottle drops from the supporting plate 21 as it passes over the edge 23, it falls into one of the pockets of the radially spaced group of pockets 33 and 35. The pockets 33 and 35 are also displaced relative to one another to begin the process of regathering the bottles in a serial fashion. As a bottle falls, the bottom strikes a ramp 37 which decelerates the bottle to avoid random inversion of the bottle when it strikes the bottom of the chute and before it comes to rest on another supporting plate 39 which supports the bottom of the bottles until they reach the next drop point. At the rear of each pocket is a vertical support plate 41 against which a bottle rests as it is pushed along the stationary plate 39. The back wall of each pocket 43 is substantially vertical and supports the ramp 37 and wall 41. Referring to FIG. 3, bottles 45 can be seen through the apertures 47 in the back plate 43. The bottles 45 are supported on a shelf 49 similar to the shelf 39. The radially spaced bottles are separated from each other by the wall 43 which separates and supports the chutes for receiving bottles from each of the concentric rows of bottles from the aligning ring 13.

The bottles in the interior chutes 35 (FIG. 2) are held in place by a plate 51 which is fastened to the frame of the unscrambler by a strap 53 which is bolted to an adjustable plate 57 by bolts 59 and 61. The strap 53 is bolted to the plate 51 by suitable bolts 63 and 65. The plate 51 can be moved vertically by means of adjusting nuts 66 and 67 which are mounted on a threaded shaft 69 which is attached to the interior frame of the machine 71 by a block 73 fastened to the frame by welding or other suitable means and a pair of fastening nuts 75 and 77 which can be tightened on either side of the block 73. Bottles 45 can be seen supported on the stationary shelf 49 which is fastened to a portion of the frame 76 by bolt 78 which has a pair of adjusting nuts 79 and 81 which hold an angled strap 83 which in turn is fastened to the shelf 49 by a bolt 85. The shelf 49 can be adjusted vertically by means of the nuts 79 and 81 on threaded shaft 77. The bottles 45 ride along the plate 49 until the end 87 is passed at which time each bottle falls into a chute 89 which is associated with each chute in the set of chutes 35 holding bottles from the inner concentric row of bottles being aligned. Each chute 89 is fastened to the wall 91 which forms the back wall of the bottle serializing ring or serializer 93.

Figure 4:
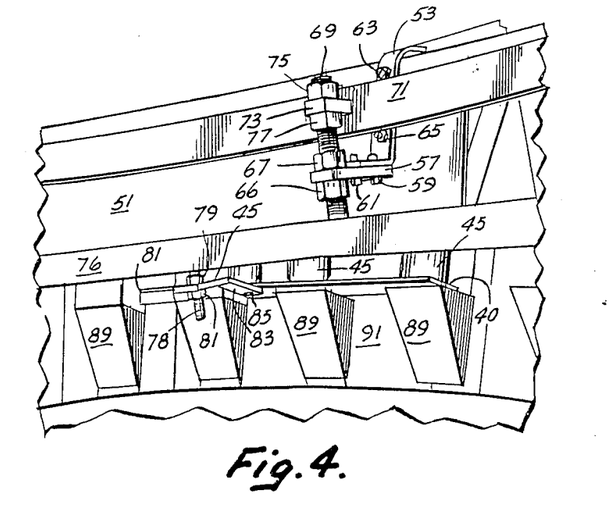
FIG. 4 is a fragmentary, elevational view of a portion of the inside of the bottle unscrambler stabilizing ring showing bottles supported on a shelf from which they are moved into a chute.
Figure 5:
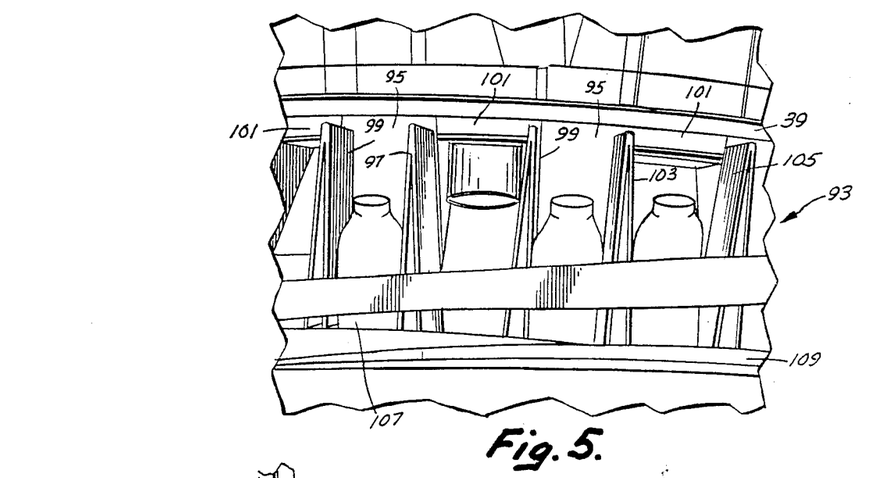
FIG. 5 is a partial, fragmentary view showing a portion of the serializing ring into which bottles are added from the first and second radially spaced chutes

Referring to FIGS. 3 and 5, the bottles 44 slide along plate 39 until they reach a point where they drop to the bottle serializer. As the bottles 44 fall off the stationary plate 39, they drop into alternate compartments 95 in the serializing ring 93. The compartments are bounded on either side by walls 97 and 99. The back of the compartment 95 is the opposite side of the plate 91 shown in FIG. 4. Between compartments 95 is another compartment 101, the back of which is formed from the chute 89 again as shown in FIG. 4. The sides of each compartment 103 and 105 are made of angled metal plates which help to deflect a bottle 45 from the interior row of radially spaced bottles down to an additional supporting shelf 107. As shown in FIG. 5, a bottle 44 can be in each compartment 95 of the serializing ring 93. A bottle 44 is also shown in a compartment 101 having arrived there by falling into the chute 89, FIG. 4, and another bottle 44 is partially shown entering a compartment 101 by sliding down chute 89. The bottles are serialized in this manner. The shelf 107, then supports the bottles completely around the interior of the unscrambler in order to stabilize the bottles and prepare them for discharge onto a conveyor belt 109 which is positioned tangential to the high point of the unscrambler substantially opposite the bottle supply collection point in the hopper and carries the aligned and serialized bottles out of the unscrambler and on to the next station which is usually an automatic filling machine.

As discussed previously, the bottle unscrambler of the present invention is a unique improvement over the article-orienting apparatus disclosed and claimed by Nalbach in U. S. Pat. No. 3,650,368. Nalbach showed no awareness that the speed of the bottle aligner could be substantially increased if concentric rows of bottle-capturing pockets were positioned above the chutes and if the chutes were interconnected to serialize the output of the unscrambler. The basic hardware drive features of the Nalbach patent have not been repeated in the instant application since that patent can be consulted for a full teaching The present invention is directed to those features added to the Nalbach structure to substantially improve both its method and speed of operation For example, the aligning ring 13 (FIG. 1) is supported from its center on a plurality of spokes extending outwardly from a plate supported by the central drive shaft The hopper is also supported as in Nalbach and through the use of suitable gearing is made to rotate in a direction opposite to that of the aligning ring, as previously discussed.

In Nalbach the bottle aligning compartments and chutes were of heavy metal construction and were fabricated as individual units which were then bolted together to form a closed ring. In contrast to the teaching of Nalbach, and certainly not in criticism, the chutes of the present invention are made of pieces of sheet steel which are preferably welded to either side of a elongated narrow sheet of steel which is closed into a ring. The walls of the chutes and compartments when joined to the steel sheet tend to form a strong, rigid unitary structure All of these metal fabrication techniques are within the skill of the art. It is the unique combination of structures formed through these techniques which is inventive.

As discussed above, the aligning ring is supported on a plurality of spokes extending from a central support The aligning ring can be made of metal, however, it is preferred to make the ring out of plastic and particularly polyvinyl chloride, PVC, which is easily worked and structurally strong.

In assembling the aligning ring, arcuate sectors of the PVC material have the offset bottle receiving pockets cut out. Each sector is approximately 4 feet long, 8 inches wide and approximately 2 inches thick. The sectors are fastened at each end to a spoke to form a closed ring. By using a plastic material the weight of the ring and in turn the weight of the supporting structure is substantially reduced.

Figure 6:
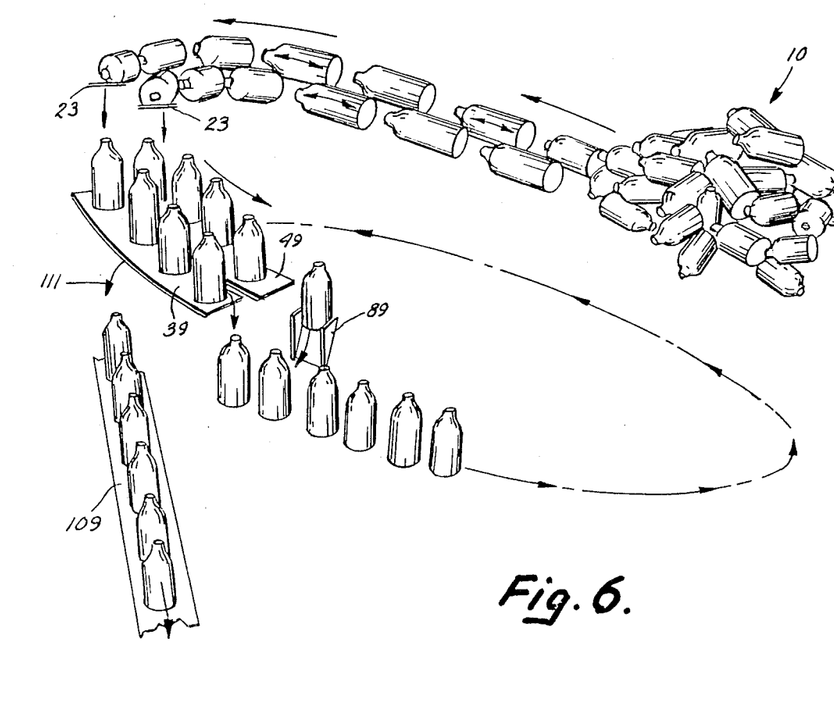
FIG. 6 is a view depicting the paths taken by the bottles as they move through the machine with only those portions of the unscrambler hardware shown necessary to complete the explanation.

FIG. 6 presents a view of the bottles in the unscrambler of the present invention with only that hardware being shown needed to complete a description of the movement of the bottles. The bottle unscrambler is positioned at an angle to the horizontal so the pile of random bottles 10 is at the low point of the machine The bottle aligning ring 13 passes below the random pile of bottles 10 and picks up a bottle in each pocket 17 and 19. The concentric row of bottles are carried upward to edge 23, which for clarity is shown as two separate points. The bottles then undergo a first drop with the outer bottles landing and being supported on shelf 39 and with the bottles from the inner row landing on and being supported by shelf 49. The bottles from shelf 39 then proceed to a point where they drop into alternate compartments in the serializing ring 93. The bottles on shelf 49 also move to a point where they drop into chutes 89 and shift for insertion into the open alternate compartments in the serializing ring. The bottles are thus carried along a steel shelf which supports the bottles through a complete revolution of the inner shell or the machine and then brings them to the exit point 111 where the bottles are transferred to continuous conveyor 109 which carries the bottles away from the unscrambler. In the course of the bottles passage through the unscrambler, they are carried as concentric radially spaced rows through each step of the process to the final serialization where the bottles are then joined in alternate serial compartments and into a single file procession around the machine until they output on the conveyor.

In the description of the unscrambler of the present invention, frequent use has been made of the term "metal" and "steel". Since this machine is intended for use in handling bottles to be filled with materials for human consumption, it is preferred to make all of the metal parts out of stainless steel which is highly polished to remove any bacterial growth sites. It is also within the scope of the present invention to use other materials in the fabrication of the unscrambler if the materials can be sterilized or given a protective coating or in some way made suitable for the safe handling of the materials involved Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A bottle unscrambler comprising:
   a bottle receiving and aligning means for ordering the bottles received from a random mix of disordered bottles into a plurality of radially spaced concentric rows;
   a plurality of radially spaced first drop means for receiving the bottles from each row of said receiving and aligning means;
   a plurality of spaced second drop means for receiving the bottles from one radial row of said first drop means and for alternately feeding the bottles into spaced compartments in a bottle serializing means;

a plurality of spaced third drop means for receiving the bottles from a radially spaced row of bottles from said first drop means and for delivering said bottles into alternate empty bottle compartments in said serializing means.

2. A bottle unscrambler comprising:

a rotatable shelf supported at its center and extending outwardly forming the bottom of a hopper;

a rotatable bottle aligner having at least two concentric rows of bottle receiving apertures positioned adjacent to the outer edge of said shelf;

a first stationary shelf below said bottle aligner adapted to keep bottles from falling through said bottle aligner throughout most of a rotation of said bottle aligner;

a first plurality of moveable chutes rotating with and below said bottle aligner and adapted to catch the bottles from a row when they are no longer supported by said first shelf;

a second stationary shelf below said first plurality of moveable chutes adapted to support the bottles for a short distance;

a second plurality of moveable chutes rotating with and below said bottle aligner and adapted to catch bottles from a different concentric row when no longer supported by said first stationary shelf;

a third stationary shelf below said second plurality of moveable chutes and adapted to support bottles for a short distance;

a third plurality of spaced moveable compartments rotating below said first and second plurality of moveable chutes and adapted to receive in alternate compartments bottles from said first and second moveable chutes as they drop from their respective supporting shelves 3. A bottle unscrambler as set forth in claim 2 wherein said rotatable bottle aligner separates the first and second sets of moveable chutes from the hopper.

4. A bottle unscrambler as set forth in claim 2 wherein said first stationary shelf extends less than 360° about the interior of said shell.

5. A bottle unscrambler as set forth in claim 2 wherein said second stationary shelf supports bottles through less than 360° of rotation of said first plurality of moveable chutes.

6. A bottle unscrambler as set forth in claim 2 wherein said third stationary shelf supports bottles for less than 360° of rotation of said second plurality of moveable chutes 7. A bottle unscrambler as set forth in claim 2 wherein said third plurality of moveable compartments includes:

a plurality of spaced moveable chutes rotating below said first plurality of moveable chutes and adapted to receive in alternate compartments bottles falling from said first plurality of moveable chutes; and a plurality of spaced moveable chutes rotating below said second plurality of moveable chutes and adapted to catch a bottle from said second plurality of moveable chutes and deliver it to the alternate spaces in said spaced plurality of moveable compartments.

8. A bottle unscrambler as set forth in claim 2 wherein a fourth stationary shelf supports the bottles in said plurality of spaced moveable compartments as the compartments move for transfer of said bottles to a tangential conveyor.

9. A bottle unscrambler as set forth in claim 2 wherein the receiving apertures of one row are staggered circumferentially with respect to the other row.

10. A bottle unscrambler as set forth in claim 2 wherein each of said receiving apertures include trip means which cause the bottom of a bottle retained therein to drop by its gravitational weight prior to the top when said bottle is free to exit said aperture 11. A bottle unscrambler as set forth in claim 4 wherein trip means are associated with said receiving apertures whereby upon discharge of a bottle from said receiving apertures, said bottle will fall bottom first regardless of its orientation in said aperture.

12. A bottle unscrambler as set forth in claim 11 wherein said trip means is another step which retains the bottle top until the bottle bottom has fallen first

* * * * *

UNITED STATES PATENT AND TRADEMARK OFFICE
CERTIFICATE OF CORRECTION

PATENT NO. : 4,979,607
DATED : December 25, 1990
INVENTOR(S) : Jon G. Fogg It is certified that error appears in the above-identified patent and that said Letters Patent is hereby corrected as shown below:

Column 1, line 37:
"cf the" should be --of the--;

Column 2, line 68:
after "chutes" insert --;--

Column 3, line 18:
"Nalback" should be --Nalbach--;

Column 3, line 55:
after "21" insert --.--;

Column 3, line 68:
after "bottles" insert --.--;

Column 4, line 2:
after "bottles" insert --.--;

Column 4, line 17:
after "machine" insert --.--

Column 5, line 35:
after "teaching" insert --.--

Column 5, line 37:
after "operation" insert --.--;

Column 5, line 41:
after "shaft" insert --.--;

UNITED STATES PATENT AND TRADEMARK OFFICE
CERTIFICATE OF CORRECTION

PATENT NO. : 4,979,607

DATED : December 25, 1990

INVENTOR(S) : Jon G. Fogg

It is certified that error appears in the above-identified patent and that said Letters Patent is hereby corrected as shown below:

Column 5, line 55:
after "structure" insert --.--;

Column 5, line 60:
after "support" insert --.--;

Column 6, line 10:
after "machine" insert --.--;

Column 6, line 25:
"shell or" should be --shell of--;

Column 6, line 48:
after "involved" insert --.--;

Column 7, claim 2, line 37:
after "shelves" insert --.--;

Column 8, claim 6, line 8:
after "chutes" insert --.--;

UNITED STATES PATENT AND TRADEMARK OFFICE
CERTIFICATE OF CORRECTION

PATENT NO. : 4,979,607

DATED : December 25, 1990

INVENTOR(S) : Jon G. Fogg

Page 3 of 3

It is certified that error appears in the above-identified patent and that said Letters Patent is hereby corrected as shown below:

Column 8, claim 10, line 34:
after "aperture" insert --.--;

Column 8, claim 12, line 42:
after "first" insert --.--.

Signed and Sealed this

Twenty-ninth Day of September, 1992

Attest:

DOUGLAS B. COMER

*Attesting Officer*   *Acting Commissioner of Patents and Trademarks*